(12) United States Patent
Liu et al.

(10) Patent No.: US 11,402,511 B2
(45) Date of Patent: Aug. 2, 2022

(54) SPECTRALLY-RESOLVED RAMAN WATER LIDAR

(71) Applicant: Wuhan University, Wuhan (CN)

(72) Inventors: Fuchao Liu, Wuhan (CN); Fan Yi, Wuhan (CN); Yunpeng Zhang, Wuhan (CN); Changming Yu, Wuhan (CN); Ying Tan, Wuhan (CN); Yujin He, Wuhan (CN); Miao Weng, Wuhan (CN); Yang Yi, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 920 days.

(21) Appl. No.: 16/158,273

(22) Filed: Oct. 11, 2018

(65) Prior Publication Data

US 2019/0041525 A1    Feb. 7, 2019

Related U.S. Application Data

(63) Continuation-in-part of application No. PCT/CN2016/110080, filed on Dec. 15, 2016.

(30) Foreign Application Priority Data

Apr. 13, 2016  (CN) .................. 201610226616.X

(51) Int. Cl.
*G01J 3/10* (2006.01)
*G01J 3/18* (2006.01)
(Continued)

(52) U.S. Cl.
CPC ............... *G01S 17/95* (2013.01); *G01J 3/024* (2013.01); *G01J 3/0208* (2013.01);
(Continued)

(58) Field of Classification Search
CPC ........ G01S 17/95; G01S 17/06; G01S 7/4808; G01S 7/4814; G01S 7/4816; G01S 17/88;
(Continued)

(56) References Cited

PUBLICATIONS

Liu F C, Yi F, Jia J Y, et al. High resolution full-spectrum water Raman lidar. Sci China Tech Sci, 2012, 55: 12241229, doi: 10.1007/s11431-012-4778-9 (Year: 2012).*

(Continued)

*Primary Examiner* — Luke D Ratcliffe
*Assistant Examiner* — Sanjida Naser
(74) *Attorney, Agent, or Firm* — Matthias Scholl P.C.; Matthias Scholl

(57) ABSTRACT

A spectrally-resolved Raman water lidar, including: a transmitter unit, a receiver unit, and a data acquisition and control unit. The transmitter unit includes a seeder, a solid Neodymium-doped Yttrium Aluminum Garnet (Nd:YAG) laser, a beam expander, and a first reflecting mirror to emit a 354.8-nm laser beam. The receiver unit includes a telescope, an iris, a collimator, a second reflecting mirror, a first bandpass filter, a beam splitter, a narrow-band interference filter, a third lens, a first detector, a second bandpass filter, a coupler and a home-made dual-grating polychromator to enable simultaneous profiling of backscattered Raman spectrum signals from water vapor, water droplets and ice crystals as well as aerosol fluorescence in the atmosphere. The data acquisition and control unit includes a computer to store the acquired data and guarantee an automatic operation of the lidar system through a time-sequence circuit.

6 Claims, 1 Drawing Sheet

(51) Int. Cl.
| | |
|---|---|
| *G01S 17/06* | (2006.01) |
| *G01J 3/02* | (2006.01) |
| *G01J 3/12* | (2006.01) |
| *G01J 3/22* | (2006.01) |
| *G01N 21/17* | (2006.01) |
| *G01S 17/95* | (2006.01) |
| *G01J 3/44* | (2006.01) |
| *G01N 21/65* | (2006.01) |
| *G01S 7/48* | (2006.01) |
| *G01S 7/481* | (2006.01) |
| *H01S 3/16* | (2006.01) |

(52) U.S. Cl.
CPC ........... *G01J 3/0218* (2013.01); *G01J 3/0262* (2013.01); *G01J 3/10* (2013.01); *G01J 3/1804* (2013.01); *G01J 3/44* (2013.01); *G01J 3/4406* (2013.01); *G01N 21/65* (2013.01); *G01S 7/4808* (2013.01); *G01S 7/4814* (2013.01); *G01S 7/4816* (2013.01); *G01S 17/06* (2013.01); *H01S 3/1611* (2013.01); *H01S 3/1643* (2013.01); *G01J 3/22* (2013.01); *G01J 2003/1213* (2013.01); *G01N 2021/1795* (2013.01); *Y02A 90/10* (2018.01)

(58) Field of Classification Search
CPC .... G01J 3/10; G01J 3/44; G01J 3/0218; G01J 3/4406; G01J 3/22; G01N 21/65; G01N 2021/1795; G01N 21/6402; H01S 3/1611; H01S 3/1643
See application file for complete search history.

(56) References Cited

PUBLICATIONS

Fuchao Liu and Fan Yi, "Spectrally resolved Raman lidar measurements of gaseous and liquid water in the atmosphere," Appl. Opt. 52, 6884-6895 (2013) (Year: 2013).*

Fuchao Liu and Fan Yi, "Lidar-measured atmospheric N2 vibrational-rotational Raman spectra and consequent temperature retrieval," Opt. Express 22, 27833-27844 (2014) (Year: 2014).*

Hailong Chen et al 2012 Appl. Phys. Express 5 092702 (Year: 2012).*

Kim D, Baik S, Cha H, Kim Y, Song I. Lidar Measurement of a Full Raman Spectrum of Water by Using a Multichannel Detector. JKPS 2009;54:38-43 (Year: 2009).*

Sun-Ho Park, Yong-Gi Kim, Duk-Hyeon Kim, Hai-Du Cheong, Won-Seok Choi, and Ji-In Lee, "Selecting Characteristic Raman Wavelengths to Distinguish Liquid Water, Water Vapor, and Ice Water," J. Opt. Soc. Korea 14, 209-214 (2010) (Year: 2010).*

Wikipedia contributors. "Perfect mirror." Wikipedia, The Free Encyclopedia. Wikipedia, The Free Encyclopedia, Apr. 27, 2020. Web. Sep. 21, 2021. (Year: 2020).*

Wikipedia contributors. "Blazed grating." Wikipedia, The Free Encyclopedia. Wikipedia, The Free Encyclopedia, Mar. 13, 2020. Web. Sep. 21, 2021. (Year: 2020).*

Newsom, R.. "Raman Lidar (RL) Handbook." (2009). (Year: 2009).*

* cited by examiner

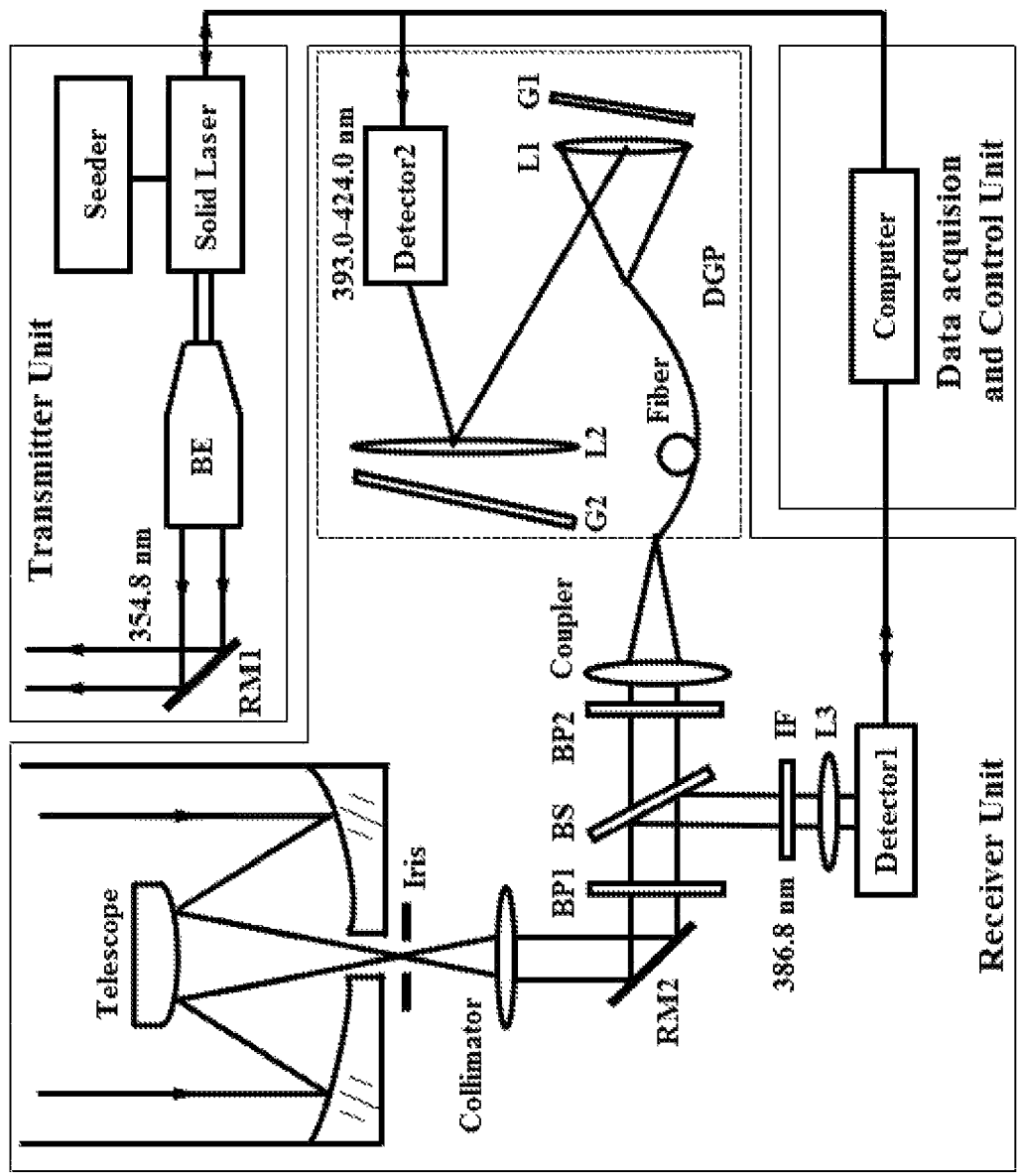

SPECTRALLY-RESOLVED RAMAN WATER LIDAR

CROSS-REFERENCE TO RELATED APPLICATIONS

This application is a continuation-in-part of International Patent Application No. PCT/CN2016/110080 with an international filing date of Dec. 15, 2016, designating the United States, now pending, and further claims foreign priority benefits to Chinese Patent Application No. 201610226616.X filed Apr. 13, 2016. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure belongs to the field of lidar remote sensing technique, and more specifically to the lidar system for simultaneously profiling the backscattered Raman spectrum signals from water vapor, water droplets and ice crystals in the atmosphere as well as aerosol fluorescence from atmospheric fluorescent aerosols.

Water is a very important component in the atmosphere. It naturally goes through three different phase states (gas, liquid and solid) and plays a crucial role through phase change in many atmospheric processes, particularly in some severe weather events. To quantify the microphysics of clouds and to fully understand related weather processes, the common-volume and species-resolved simultaneous measurements of water vapor, water droplets and ice crystals are required. The Raman lidar provides a conceptually-feasible technical scheme for these requirements. A lidar is a measuring system that detects and locates objects on the same principle as radar but uses light from a laser. Conventional water vapor Raman lidar measures simply the water vapor (mixing ratio) profiles by extracting the Q-branch signals in the backscattered ro-vibrational Raman spectra of the water molecules and molecular nitrogen with narrow-band (0.3-1.0 nm) interference filters (IF). The existing Raman lidars for simultaneously detecting condensed water and water vapor have followed two different approaches. One approach utilizes two discrete receiver channels to extract the backscattered Raman signals respectively from condensed water and water vapor. Since the Raman signals from condensed water overlap in the spectrum with that of water vapor and are often contaminated by aerosol fluorescence, the two-channel approach is difficult to discriminate the isolated contribution from condensed water or water vapor. The spectral overlap would make some unreasonable results come out of the discrete-channel Raman lidar. The water vapor channel contaminated by the condensed water Raman spectrum signals may deliver a relative humidity of >100% in a cloud. The condensed water phase channel contaminated by the water vapor Raman spectrum signals suffers from difficulties in processing and calibration. When the transmitter emits an ultraviolet laser beam (e.g., ~355 nm), the (biogenic) aerosol-induced fluorescence and possible inner-instrument fluorescence would cover a wide spectrum range which crams the entire Raman band of three-phase water. In this case, the discrete-channel Raman lidar would often produce false measurement results. Another approach employs a spectrometer (a grating-based spectrograph plus a linear-array photomultiplier) to extract the full Raman spectrum of water. With a 355-nm transmitter, Kim et al. developed a prototype of the spectrometer-based Raman lidar for simultaneously detecting condensed water and water vapor. Their home-made spectrometer has double-grating configuration and an extracted Raman spectrum range from −402.4 to 411.0 nm. This spectrum range only covers the main part of the ro-vibrational Raman backscatter spectrum of water vapor and segments of the Raman spectra of liquid droplets and ice particles that are close to the water vapor Raman spectrum. Because of the narrow spectrum coverage, the prototype Raman lidar is also difficult to separate the Raman signal of condensed water from that of water vapor and aerosol fluorescence. By using a commercial Czerny-Turner spectrograph and a 32-channel linear-array photomultiplier tubes (PMT), a spectrally-resolved Raman lidar at an incident laser wavelength of −355 nm for simultaneously detecting three-phase water in the atmosphere has been developed. The Raman lidar can register the spectrum between 385 and 410 nm with a spectral resolution of −0.8 nm. According to the theoretical calculation, the registered spectrum ranges from the S branch of the $N_2$ Stokes ro-vibrational band to the outside wing of the Stokes ro-vibrational band for water vapor. This makes it difficult to remove the aerosol fluorescence contamination from the Raman signal of condensed water because the spectrum segment (390-394 nm for the isolated fluorescence contribution) therein unaffected by the Raman scattering from water vapor, condensed water and molecular nitrogen is too narrow to effectively identify the aerosol fluorescence spectrum. Furthermore, the condensed water spectra have to be inferred by the inner-cloud water vapor mixing ratio from a water vapor channel contaminated by the liquid water Raman spectrum signals. Therefore, the condensed water Raman spectrum obtained from the spectrally-resolved Raman lidar represents some marginal cloud events where both the liquid water Raman signal and aerosol fluorescence are weak.

To overcome the drawbacks in extracting the Raman spectra from condensed water and water vapor in a cloud, one needs to design a new spectrally-resolved Raman lidar with well-arranged spectrum coverage. Accordingly, one also needs to develop a new method to extract the isolated Raman spectra from condensed water and water vapor in a cloud.

SUMMARY

In the related art, a spectrally resolved Raman lidar (with an emission wavelength of 355 nm) for measuring gaseous and liquid water in the atmosphere has been reported. It is found that the lidar-observed Raman water spectrum in the very clear atmosphere is nearly invariable in shape. It is dominated by water vapor, and can serve as background reference for Raman lidar identification of the phase state of atmospheric water under various weather conditions. Based on this finding and a fact that the aerosol fluorescence spectrum is usually slowly varying in a wavelength range of −30 nm, we have rebuilt a spectrally-resolved Raman lidar with a 355-nm emission and a receiving spectrum range from 393.0 to 424.0 nm with 1.0-nm spectral resolution. Accordingly, a new method is developed to successively extract (separate) the aerosol fluorescence and the Raman spectra of water vapor and water droplets/ice crystals in a cloud.

The disclosure proposes a spectrally-resolved Raman lidar which enables the altitude-dependent aerosol fluorescence and Raman spectra of water vapor and water droplets/ice crystals in the cloud to be obtained. The lidar system comprises a transmitter unit, a receiver unit and a data acquisition and control unit. The transmitter unit utilizes an injection-seeded solid laser to emit a narrow-band 354.8 nm laser beam and guides it zenithward. The receiver unit collects signals from atmospheric backscatters. It samples the extended three-phase Raman water spectrum between 393.0 and 424.0 nm with a 1.0-nm spectral resolution and provides a high suppression of >15 orders of magnitude to the elastic signal around 354.8 nm as well as a suppression of more than 6 orders of magnitude respectively to the $O_2$ and $N_2$ ro-vibrational Raman signals around 375.5 and 386.8 nm. The data acquisition and control unit stores the acquired data and makes the entire lidar system operate orderly.

Disclosed is a lidar, comprising: a transmitter unit, a receiver unit, and a data acquisition and control unit. The transmitter unit comprises a seeder, a solid Nd:YAG laser, a beam expander (BE) and a first reflecting mirror. The receiver unit comprises a telescope, an iris, a collimator, a second reflecting mirror, a first bandpass filter (BP1), a beam splitter (BS), a narrow-band interference filter (IF), a third lens (L3), a first detector (detector1), a second bandpass filter (BP2), a coupler and a home-made dual-grating polychromator (DGP). The data acquisition and control unit comprises a computer to store the acquired data and guarantee the automatic operation of the whole lidar system through a time-sequence circuit.

The seeder generates an extremely narrow-band infrared 1064 nm fundamental laser light. The 1064-nm light is guided by an optical fiber into the resonant cavity of the solid laser. The solid laser amplifies the fundamental light and then triples it by a tripling crystal to yield a 354.8-nm ultraviolet laser beam. A home-made beam expander (BE) compresses the beam divergence by a factor of 5 and also reduces the radiant flux density of the output laser beam. The expanded laser beam is guided into atmosphere zenithward by the reflecting mirror RM1 that is put on a two-dimensional electronically-adjustable mount.

The telescope collects signals from atmospheric backscatters. After the iris, the collected signal lights become a collimated light by the collimator. The collimated light beam is redirected to horizontal by the RM2 and then passes through the BP1. The BP1 has a transmission of >94% in the 387-447 nm spectrum range and a suppression of >6 orders of magnitude to the elastic signal around 354.8 nm. The transmitted light is separated into two parts by the BS: 10% is reflected to enter the IF, while the remaining ~90% is transmitted to enter the BP2. The IF has a central wavelength (CWL) of 386.8 nm and a bandwidth of 0.3 nm to pick out mainly the Q-branch signal of the $N_2$ ro-vibrational Raman spectra. It is of a transmission of ~30% around 386.8 nm and a suppression of >6 orders of magnitude to the elastic signal around 354.8 nm. The 386.8-nm light exiting the IF is focused by the L3 and detected by the detector1 as a reference signal. The BP2 transmits the incident light in the 393.0-424.0 nm range with a transmission of >80% which are then coupled into the DGP by the coupler. Meanwhile, the light signals around 354.8 nm, 375.5 nm and 386.8 nm are strongly suppressed with a suppression of >3 orders of magnitude.

We have designed and manufactured a special double-grating polychromator (DGP) for the spectrally-resolved Raman lidar system. The DGP comprises a multi-mode optical fiber, two separate single-grating polychromators and a 32-channel linear-array PMT (detector2). The fiber transmits the bandpass-filtered light into the DGP. Each single-grating polychromator has a quasi-Littrow configuration that comprises a lens and a grating. The first single-grating polychromator performs an initial spectral dispersion of the incoming signals in the 393.0-424.0 nm range. The complete Raman spectrum is further dispersed by the second single-grating polychromator. The two single-grating polychromators have optical axes parallel to each other in the same horizontal plane with a distance of 53.69 mm and share the same vertical focal plane. The two single-grating polychromators are cascaded to disperse the signal light in the 393.0-424.0 nm range with a linear dispersion of 1.0 mm $nm^{-1}$. The detector2 (32-channel linear-array PMT) is located exactly on the focal plane of the second single-grating polychromator, registering the dispersed spectra in the 393.0-424.0 nm range with a 1.0-nm spectral resolution.

The fiber has a core diameter of 0.6 mm and a numerical aperture (NA) of 0.12 with its end surface center being at the focal point of the L1. The L1 has a clear aperture of 100 mm and a focal length of 300 mm, while the L2 has a clear aperture of 100 mm and a focal length of 400 mm. Both the L1 and L2 are coated to guarantee a transmission of >99% in the 393.0-424.0 nm range. The first grating is a planar reflection blazing grating with a groove density of 600 gr $mm^{-1}$ and blazing angle of 6.89°. It operates with a working angle of 9.27° and diffraction order of 1. The second grating is similar to the first grating in type, but has a blazing angle of 21.10°. It operates with a working angle of 21.72° and diffraction order of 3. The detector2 is a linear-array detector that has 32 individual photomultiplier tubes (PMTs). Each photosurface of the individual PMTs has a geometrical size of 0.8-mm width and 7.0-mm length. The spacing distance and dead area interval between two adjacent PMTs are 1.0 mm and 0.2 mm, respectively. The photosurfaces of the 32 PMTs are located exactly on the focal plane of the L2, and their 7.0-mm sides are adjusted to be parallel to the vertical direction.

The DGP delivers the signal light in the spectral range of 393.0-424.0 nm with a linear dispersion of 1.0 mm $nm^{-1}$, but has a suppression of >6 orders of magnitude to the elastic signal around 354.8 nm, as well as a suppression of >3 orders of magnitude respectively to the $O_2$ and $N_2$ ro-vibrational signals around 375.5 and 386.8 nm. The detector2 registers the DGP-dispersed the signal light in the 393.0-424.0 nm range with a 1.0-nm spectral resolution. Since the water vapor, liquid droplets and ice particles generate the ro-vibrational Raman spectra respectively in the ranges of 401-418 nm, 396-410 nm and 395-409 nm for a 354.8-nm laser radiation, the detector2-registered signal light in the 393.0-424.0 nm range covers full Raman water spectra which allow us to identify the three-phase water in the atmosphere. In addition, the registered signal light in the spectrum ranges of 393-394 and 419-424 nm can be used to determine the presence of fluorescent aerosols and further to infer the aerosol fluorescence spectrum in the 393.0-424.0 nm range. Thus, the spectrally-resolved Raman lidar can simultaneously obtain the Raman spectra from the three-phase water in the atmosphere/cloud as well as the aerosol fluorescence spectra therein.

As mentioned above, a joint usage of the BP1, BP2 and DGP yields a suppression of more than 15 orders of magnitude to the elastic signal around 354.8 nm, while a combined effect of the BP2 and the DGP results in a suppression of more than 6 orders of magnitude to the $O_2$ and $N_2$ ro-vibrational signals around 375.5 and 386.8 nm, respectively. Such high suppressions enable the weak Raman spectra from condensed water and aerosol fluorescence to be identified effectively.

As mentioned above, the spectrally-resolved Raman lidar can simultaneously measure the Raman spectra from the three-phase water and aerosol fluorescence spectra in the atmosphere. This capability is achieved by the home-made DGP that records the backscattered signal light in the 393.0-424.0 nm spectrum range with a 1.0-nm spectral resolution for a 354.8-nm emission.

The lidar of the disclosure has the following advantages and positive effects:

The spectrally-resolved Raman lidar enables the altitude-dependent aerosol fluorescence and Raman spectra of water vapor and water droplets/ice crystals in a cloud to be obtained simultaneously. The height-dependent Raman spectra of the three-phase water make the microphysical structure of a cloud layer be identified. Their time sequences reflect the evolution of the related weather processes. The Raman lidar is an effective remote sensing instrument for studying the microphysics of cloud and relevant weather processes as well as the interaction between cloud and aerosols.

With a home-made DGP and bandpass filters (BP1 and BP2), the spectrally-resolved Raman lidar has a well-designed receiver spectrum coverage (393.0-424.0 nm) that allows us to separate the weak Raman signal of condensed water from that of water vapor and aerosol fluorescence. A joint usage of the DGP and bandpass filters (BP1 and BP2) yields a suppression of more than 15 orders of magnitude to the elastic signal around 354.8 nm, while a combination of the BP2 and DGP results in a suppression of more than 6 orders of magnitude to the $O_2$ and $N_2$ ro-vibrational Raman signals around 375.5 and 386.8 nm, respectively. Such suppressions ensure that the desired weak water Raman and aerosol fluorescence signals in the spectrum range of 393.0-424.0 nm are not contaminated by the extremely strong elastic signal as well as the strong $O_2$ and $N_2$ ro-vibrational Raman signals.

According to the lidar-registered spectrum in the range of 393.0-424.0 nm, a new method is developed to successively extract (separate) the aerosol fluorescence and the Raman spectra of water vapor and water droplets/ice crystals in the cloud. The spectral intensities in the 393-394 and 419-424 nm are used to derive the aerosol fluorescence spectrum in the range of 393.0-424.0 nm and thus determine the presence of fluorescent aerosols. Noting a fact that the Raman spectrum of water vapor is nearly invariable in shape, the Raman spectra of condensed water are obtained by successively subtracting the aerosol fluorescence spectrum and the Raman spectrum of water vapor in a cloud.

BRIEF DESCRIPTION OF THE DRAWING

The invention is described hereinbelow with reference to accompanying drawings, in which the sole FIGURE is a schematic layout of the spectrally-resolved Raman lidar system (BE, beam expander; RM, reflecting mirror; BP, bandpass filter; BS, beam splitter; IF, interference filter. L, lens; G, grating; DGP, dual-grating polychromator)

DETAILED DESCRIPTION

The invented lidar system comprises a transmitter unit, a receiver unit and a data acquisition and control unit. The sole FIGURE presents its schematic layout.

The transmitter unit comprises a seeder, a solid Nd:YAG laser, a beam expander (BE) and a first reflecting mirror. The seeder (NP Photonics Inc., US) generates a narrow-band infrared 1064 nm fundamental laser light. The 1064 nm fundamental light is guided into the resonant cavity of the solid Nd:YAG laser (Innolas Spitlight 600, DE) by an optical fiber. The solid laser amplifies the fundamental light and triples it by a tripling crystal, then emits a 354.8 nm ultraviolet laser light (line width<0.1 pm). A home-made BE compresses the beam divergence by a factor of 5 and also reduces the radiant flux density of the output laser beam. The expanded laser beam is guided into atmosphere zenithward by the RM1 (reflectivity>99.5%) that is put on a two-dimensional electronically-adjustable mount (Kohzu, JP).

The receiver unit comprises a telescope, an iris, a collimator, a second reflecting mirror (RM2), a first bandpass filter (BP1), a beam splitter (BS), a narrowband interference filter (IF), a third lens (L3), a first detector (detector1), a second bandpass filter (BP2), a coupler and a dual-grating polychromator (DGP). The customized telescope has a Cassegrain configuration with an aperture of 0.45 m and a focal length of 4.0 m. The backscattered light collected by the telescope is focused on the iris. The iris on the focal plane of the telescope is used for controlling the lidar's field of view. The light exiting the iris is converted to a collimated light by the self-designed collimator with a focal length of 120 mm. The collimated light is redirected to horizontal by the RM2 and then passes through the BP1 (Semrock, US). The BP1 has a transmission of >94% to incident light in the 387.0-447.0 nm range, but a suppression of 6 orders of magnitude to the elastic signal around 354.8 nm. The BS (Union Optic, CN) separates the transmitted light beam into two parts in terms of intensity: 10% is reflected to enter the IF, while the remaining ~90% is transmitted to enter the BP2. The IF (Andover, US) has a central wavelength (CWL) of 386.8 nm and a bandwidth of 0.3 nm, picking out mainly the Q-branch signal of the $N_2$ vib-rotational Raman spectra. It is of a transmission of ~30% around 386.8 nm and a suppression of 6 orders of magnitude around 354.8 nm. The 386.8-nm light is focused onto the detector1 by the L3 as reference signal. The detector1 is a photomultiplier tube (R4632, Hamamatsu, JP) with a quantum efficiency of ~25% around 386.8 nm. The BP2 (Materion Barr, US) is a customized bandpass filter. It has a transmission of >80% to the signal light in the 393.0-424.0 nm range and a suppression of more than 3 orders of magnitude to the elastic signal around 354.8 nm as well as the $O_2$ and $N_2$ ro-vibrational Raman signals around 375.5 and 386.8 nm, respectively. The signal light exiting the BP2 is then coupled into the DGP by the coupler (Thorlabs, US). The coupler has a focal length of ~50 mm and clear aperture of 22 mm.

The DGP comprises a multi-mode optical fiber, two single-grating polychromators and a 32-channel linear-array PMTs (detector2). The fiber is customized (Fiberguide, US). It is 5-m long, having a core diameter of 0.6 mm and a numerical aperture of 0.12. The center of its entrance end surface is put on the focal point of the coupler, while its exit end surface is centered at the focal point of the L1. The output of the fiber is fed into the DGP. The first single-grating polychromator performs an initial spectral separation of the incident signal light in the spectrum range of 393.0-424.0 nm. It is of a quasi-Littrow configuration composed of a customized first lens (L1) and a first grating (G1). The L1 (Union Optic, CN) has an aperture of 100 mm and a focal length of 300 mm. The first grating (Newport, US) is an 110 mm×110 mm planar reflection blazing grating which has a groove density of 600 gr mm$^{-1}$ and blazing angle of 6.89°. It operates at the first diffraction order with a working angle of 9.27°. The signal light is then further dispersed by the second single-grating polychromator. It also has a quasi-Littrow configuration composed of a customized second lens (L2) and a second grating (G2). The L2 (Union Optic, CN) has an aperture of 100 mm and a focal length of 400 mm. The second grating (Newport, US) is an 135 mm×110 mm planar reflection blazing grating which has a groove density of 600 gr mm$^{-1}$ and blazing angle of 21.10°. It operates at the third diffraction order with a working angle of 21.72°. The two single-grating polychromators have their optical axes parallel to each other in the same horizontal plane with a spacing of 53.69 mm and share the same vertical focal plane. The two single-grating polychromators are cascaded to provide an overall linear dispersion of 1.0 mm nm$^{-1}$ in the spectral range of 393.0-424.0 nm, meanwhile yielding a suppression of more than 6 orders of magnitude to the elastic signal around 354.8 nm, and a suppression of more than 3 orders of magnitude respectively to the $O_2$ and $N_2$ ro-vibrational Raman signals around 375.5 and 386.8 nm. The dispersed signal light exiting the second single-grating polychromator is recorded by the second detector with a 1.0-nm spectral resolution. The second detector (Licel, DE) contains a 32-channel linear-array PMTs (H7260, Hamamatsu, JP). Each photosurface of the individual PMTs has a geometrical size of 0.8-mm width and 7.0-mm length. The spacing distance and dead area interval between two adjacent PMTs are 1.0 mm and 0.2 mm, respectively. The photosurfaces of the 32 PMTs are located exactly on the focal plane of the second lens, and their 7.0-mm sides are adjusted to be parallel to the vertical direction.

With a computer plus time-sequence circuits, the data acquisition and control unit stores the acquired data and controls the operation of the entire lidar system orderly. A MCS-pci card (Ametek, US) acquires the $N_2$ Raman data from the detector1, while a Licel Multispectral Lidar Detector (Licel, DE) records the light signals in the spectrum range of 393.0-424.0 nm from the detector2 via an Ethernet cable. The acquired data are stored every ten minutes by a self-developed program. The program also controls the automatic operation of the whole lidar system through a home-made time-sequence circuit.

It will be obvious to those skilled in the art that changes and modifications may be made, and therefore, the aim in the appended claims is to cover all such changes and modifications.

What is claimed is:

1. A lidar, comprising:
   a transmitter unit;
   a receiver unit; and
   a data acquisition and control unit;
   wherein:
   the transmitter unit comprises an injection-seeded solid laser configured to emit and guide a narrow-band 354.8 nm laser beam zenithward;
   the receiver unit is configured to collect signals from atmospheric backscatters, and to sample extended three-phase Raman water spectra between 393.0 nm and 424.0 nm with a 1.0-nm spectral resolution; and the receiver unit exhibits a suppression of more than 15 orders of magnitude to an elastic signal around 354.8 nm and a suppression of more than 6 orders of magnitude respectively to $O_2$ and $N_2$ ro-vibrational Raman signals around 375.5 nm and 386.8 nm; wherein the extended three-phase Raman water spectra between 393.0 nm and 424.0 nm comprise full Raman spectra of water and two Raman spectra segments of aerosol fluorescence that are free of Raman signal of water; and
   the data acquisition and control unit is configured to store acquired data.

2. The lidar of claim 1, wherein:
   the transmitter unit comprises a seeder, a solid Neodymium-doped Yttrium Aluminum Garnet (Nd:YAG) laser, a beam expander, and a first reflecting mirror;
   the seeder adapts to generate a narrow-band infrared 1064 nm fundamental laser light which is guided into a resonant cavity of the solid Nd:YAG laser by an optical fiber, amplified by the Nd:YAG solid laser and tripled by a tripling crystal, to yield a 354.8 nm ultraviolet laser light with a line width of <0.1 pm;
   the beam expander adapts to compress a beam divergence by a factor of 5 and reduce a radiant flux density of an output laser beam;
   an expanded laser beam is guided into atmosphere zenithward by the first reflecting mirror that is put on a two-dimensional electronically-adjustable mount; and
   the first reflecting mirror has a reflectivity of >99.5% for an incoming laser light.

3. The lidar of claim 1, wherein:
   the receiver unit comprises a telescope, an iris, a collimator, a second reflecting mirror, a first bandpass filter, a beam splitter (BS), a narrowband interference filter (IF), a third lens, a first detector, a second bandpass filter, a coupler and a dual-grating polychromator (DGP);
   the telescope adapts to collect signals from atmospheric backscatters;
   the iris adapts to set the lidar's field of view;
   the collimator adapts to collimate a signal light into a collimated light, and the collimated light beam is redirected to horizontal by the second reflecting mirror and then passes through the first bandpass filter;
   the first bandpass filter has a transmission of >94% in the 387-447 nm spectrum range and a suppression of >6 orders of magnitude to the elastic signal around 354.8 nm;
   the beam splitter adapts to divide the transmitted signal light into two parts: 10% of the transmitted signal light is reflected to illuminate the narrowband interference filter, and remaining 90% is transmitted to enter the second bandpass filter;
   the narrowband interference filter has a central wavelength of 386.8 nm and a bandwidth of 0.3 nm to pick out a Q-branch signal of $N_2$ ro-vibrational Raman spectra, and is of a transmission of 30% around 386.8 nm and a suppression of >6 orders of magnitude to the elastic signal around 354.8 nm; the 386.8-nm light exiting the narrowband interference filter is focused by the third lens and detected by the first detector as a reference signal;
   the second bandpass filter adapts to transmit an incident light in the 393.0-424.0 nm range with a transmission of >80% which are coupled into the dual-grating polychromator by the coupler and provides a suppression of more than 3 orders of magnitude to the elastic signal around 354.8 nm as well as the $O_2$ and $N_2$ ro-vibrational Raman signals around 375.5 nm and 386.8 nm, respectively; and
   the coupler has a focal length of 50 mm and clear aperture of 22 mm.

4. The lidar of claim 1, wherein
   the data acquisition and control unit comprises a computer to store acquired data and guarantee the operation of the lidar orderly through a time-sequence circuit;
   the computer comprises a MCS-pci card adapting to acquire $N_2$ Raman data from the first detector, and a Licel Multispectral Lidar Detector adapting to record the light signals in the spectrum range of 393.0-424.0 nm from a second detector via an Ethernet cable; and the acquired data are stored every ten minutes by a self-developed program.

5. The lidar of claim 3, wherein:

the dual-grating polychromator comprises a multi-mode optical fiber, a first single-grating polychromator, a second single-grating polychromator, and a second detector;

the multi-mode optical fiber provides a feeder for a signal light into the dual-grating polychromator;

the first single-grating polychromator comprises a first lens and a first grating, and the second single-grating polychromator comprises a second lens and a second grating; the first and second single-grating polychromators are both quasi-Littrow configured; the first and second single-grating polychromators have their optical axes parallel to each other in the same horizontal plane with a spacing of 53.69 mm and share the same vertical focal plane; the first and second single-grating polychromators are cascaded to provide an overall linear dispersion of 1.0 mm nm$^{-1}$ in the spectral range of 393.0-424.0 nm, meanwhile yielding a suppression of more than 6 orders of magnitude to the elastic signal around 354.8 nm, and a suppression of more than 3 orders of magnitude respectively to the $O_2$ and $N_2$ ro-vibrational Raman signals around 375.5 nm and 386.8 nm; and a dispersed signal light exiting the second single-grating polychromator is recorded by the second detector with a 1.0-nm spectral resolution.

6. The lidar of claim 5, wherein:

the multi-mode optical fiber is 5-m long, having a core diameter of 0.6 mm and a numerical aperture of 0.12; a center of its entrance end surface is put on a focal point of the coupler, while its exit end surface is centered at a focal point of the first lens;

the first lens has an aperture of 100 mm and a focal length of 300 mm;

the first grating is an 110 mm×l10 mm planar reflection blazing grating which has a groove density of 600 gr mm$^{-1}$ and blazing angle of 6.89°, operates at the first diffraction order with a working angle of 9.27°;

the second lens has an aperture of 100 mm and a focal length of 400 mm;

the second grating is an 135 mm×110 mm planar reflection blazing grating which has a groove density of 600 gr mm$^{-1}$ and blazing angle of 21.10°, operates at the third diffraction order with a working angle of 21.72°;

the second detector is a 32-channel linear-array photomultiplier tubes (PMTs); each photosurface of the individual PMTs has a geometrical size of 0.8-mm width and 7.0-mm length;

a spacing distance and dead area interval between two adjacent PMTs are 1.0 mm and 0.2 mm, respectively; and the photosurfaces of the 32 PMTs are located exactly on the focal plane of the second lens.

* * * * *